(12) United States Patent
Han

(10) Patent No.: US 12,135,117 B2
(45) Date of Patent: Nov. 5, 2024

(54) LAMP HEAT DISSIPATION SYSTEM

(71) Applicant: HYUNDAI MOBIS CO., LTD., Seoul (KR)

(72) Inventor: Seong Yeon Han, Osan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/493,679

(22) Filed: Oct. 24, 2023

(65) Prior Publication Data

US 2024/0159378 A1   May 16, 2024

(30) Foreign Application Priority Data

Nov. 16, 2022  (KR) .................. 10-2022-0153430
Nov. 16, 2022  (KR) .................. 10-2022-0153437

(51) Int. Cl.
| | |
|---|---|
| *F21S 45/48* | (2018.01) |
| *F21S 41/147* | (2018.01) |
| *F21S 41/25* | (2018.01) |
| *F21S 41/675* | (2018.01) |
| *F21S 45/43* | (2018.01) |
| *F21V 29/503* | (2015.01) |
| *F21V 29/505* | (2015.01) |

(52) U.S. Cl.
CPC ............. *F21S 45/48* (2018.01); *F21S 41/147* (2018.01); *F21S 41/25* (2018.01); *F21S 41/675* (2018.01); *F21S 45/43* (2018.01); *F21V 29/503* (2015.01); *F21V 29/505* (2015.01)

(58) Field of Classification Search
CPC .... G03B 21/008; G03B 21/14; G03B 21/005; G03B 21/001; G03B 21/10; G03B 21/13; G03B 21/54; G03B 23/00
See application file for complete search history.

(56) References Cited

U.S. PATENT DOCUMENTS

| | | | |
|---|---|---|---|
| 2019/0277473 A1* | 9/2019 | Drueppel | F21S 41/32 |
| 2022/0290828 A1* | 9/2022 | Li | F21S 41/265 |

FOREIGN PATENT DOCUMENTS

| | | |
|---|---|---|
| JP | 2018-101777 | 6/2018 |
| KR | 2020-0086339 | 7/2020 |

OTHER PUBLICATIONS

English Language Abstract of JP 2018-101777 published Jun. 28, 2018.
English Language Abstract of KR 2020-0086339 published Jul. 16, 2020.

* cited by examiner

*Primary Examiner* — Elmito Breval
(74) *Attorney, Agent, or Firm* — DLA Piper LLP US

(57) ABSTRACT

A lamp system, and more particularly, a lamp heat dissipation system including a heat dissipation function. The lamp heat dissipation system may reduce a module size and improve optical performance by including one light emitting diode (LED) and reducing a distance between a light source and a digital micro-mirror device (DMD) module, and a distance between the DMD module and a projection optical system, and may reduce the module size and improve heat dissipation performance by configuring the LED and the DMD module to dissipate heat as one heat dissipation structure.

18 Claims, 14 Drawing Sheets

LAMP HEAT DISSIPATION SYSTEM

CROSS-REFERENCE TO RELATED APPLICATIONS

This application claims priority under 35 U.S.C. § 119 to Korean Patent Application No. 10-2022-0153437, filed on Nov. 16, 2022 and Korean Patent Application No. 10-2022-0153430, filed on Nov. 16, 2022, in the Korean Intellectual Property Office, the disclosure of which is incorporated herein by reference in its entirety.

TECHNICAL FIELD

The following disclosure relates to a lamp system, and more particularly, to a lamp heat dissipation system including a heat dissipation function.

BACKGROUND

A head lamp of a vehicle may emit light to the front of the vehicle, and may be one of the safety devices preventing accidents by securing a driver's front view in a wide range. Beam patterns implemented through the head lamp may include a low beam mode, a high beam mode, and an adaptive driving beam (ADB) mode.

A content display using the head lamp may be technology of implementing the content display by segmenting (or pixelating) a lighting region and individually controlling turning on or off of the segmented lighting region based on a shape of a content (or information) provided for each position or on a road surface, and the content display may be implemented using a conventional digital micro-mirror device (DMD) chip.

The DMD chip may include hundreds of thousands of micro mirrors each having a micro size and arranged in a checkerboard pattern. The micro mirror is a multi-layered metal having an electrical signal, has a function of reflecting incident light, and may individually tilt at a very high speed based on a digital input signal by a pulse width modulation (PWM) driving method.

A conventional vehicle head lamp including the DMD chip may include a plurality of light emitting diode (LED) light sources emitting light to the DMD chip for its design freedom, the LED light sources being spaced apart from each other by a certain distance. However, this configuration causes the increased number of collimator lenses that organize light of the respective LED light sources, an inevitably-increased overall package size, a separate heat dissipation system required for each of the LEDs and the DMD chips, and light energy loss and lower optical performance occurring due to each LED light being dissipated.

In addition, the DMD chip, which serves a key function in the vehicle head lamp, may usually use a ceramic material, and thus be very vulnerable to external vibration and impact. The conventional vehicle head lamps may use a compression spring in which a spring is inserted into a screw or a pin to apply a pressure as a mounting method to secure the DMD chip. However, this method may be very inefficient in terms of assembly/mass production, which leads to a need for its structural improvement.

RELATED ART DOCUMENT

Patent Document (Patent Document 1) Korean Patent Laid-Open Publication No. 10-2020-0086339, "LIGHTING ARRANGEMENT WITH A SPATIALLY CONTROLLABLE REFLECTOR ELEMENT" (published on Jul. 16, 2020)

SUMMARY

An embodiment of the present disclosure is directed to providing a lamp heat dissipation system which may reduce a module size and improve optical performance by including one light emitting diode (LED) and reducing a distance between a light source and a digital micro-mirror device (DMD) module, and a distance between the DMD module and a projection optical system.

Another embodiment of the present disclosure is directed to providing a lamp heat dissipation system which may reduce a module size and improve heat dissipation performance by configuring an LED and a DMD module to dissipate heat as one heat dissipation structure.

Still another embodiment of the present disclosure is directed to providing a lamp heat dissipation system which may provide a more stable system by including a flat fixing plate and mounting a DMD element thereon by means of a mounting structure using a spring-type elastic feature provided on the fixing plate.

Yet another embodiment of the present disclosure is directed to providing a lamp heat dissipation system which includes a flat fixing plate directly coupled to a heat sink, the DMD module fixed to the heat sink, and a protruding contact part preventing the DMD module from being in full contact with the heat sink to prevent vibration and impact from being directly transmitted to the DMD module, thereby providing a more stable system.

In one general aspect, a lamp heat dissipation system includes: an illumination optical system including a light source and a digital micro-mirror device (DMD) module including a plurality of micro mirrors; a projection optical system receiving light transmitted from the illumination optical system and projecting light to the outside; and a heat dissipation unit dissipating heat from the illumination optical system to the outside, wherein the heat dissipation unit simultaneously dissipates heat from each of the light source and the DMD module.

The illumination optical system may include less than two light sources.

The illumination optical system may further include a collimator lens including a holder coupled to the light source, and emitting light of the light source in parallel; and a reflecting surface for receiving light from the collimator lens and reflecting light.

The DMD module may be disposed behind the light source, receive light from the reflecting surface, and transmit light to the projection optical system.

The projection optical system may include a first lens which is a convex lens directly receiving light from the illumination optical system, a second lens which is a concave lens receiving light from the first lens and transmitting light, and a third lens which is a convex lens receiving light from the second lens and projecting light to the outside.

The DMD module may be disposed to be parallel to the first lens.

An effective focal length between the DMD module and the first lens may be greater than zero mm and less than 50 mm.

The effective focal length between the DMD module and the first lens may be less than 1.4 times an exit aperture of the third lens.

The heat dissipation unit may include a first heat dissipation frame sandwiched between the light source and the DMD module, and having one end in contact with the light source, a heat sink being formed on the one end, and a second heat dissipation frame having one surface with which the DMD module is in contact from the rear and the other surface on which a heat sink is formed.

The first heat dissipation frame may include a light emission hole positioned to correspond to the DMD module.

The second heat dissipation frame may include a contact part having a predetermined height and protruding from one surface, and the contact part may be positioned to correspond to the DMD module.

Each of the first heat dissipation frame and the second heat dissipation frame may include the heat sink, the heat sink may include at least one of a plurality of pins each having a predetermined height and positioned on the other surface of the second heat dissipation frame to correspond to a fan or thin plates each having a predetermined thickness and positioned in a region excluding its position corresponding to the fan, and the respective pins or the respective thin plates may be disposed to be spaced apart from each other by a certain distance.

The system may further include: a DMD plate having one surface coupled to the DMD module and the first heat dissipation frame and whose position is supported by the first heat dissipation frame; and a fixing plate including a flat front support plate in contact with the other surface of the second heat dissipation frame and simultaneously supporting the DMD plate and the second heat dissipation frame.

The fixing plate may include at least one first mount part mounted on the second heat dissipation frame and supporting a position of the second heat dissipation frame.

The first mount part may be positioned on the front support plate, have one end formed integrally with the front support plate, and have the other end where a first coupling hole is positioned and coupled to the second heat dissipation frame.

The fixing plate may include two second mount parts extending to both its sides, and each second mount part may be mounted on the first heat dissipation frame to support a position of the first heat dissipation frame.

The second mount part may include a side support plate which is a flat plate having one side connected to the front support plate and perpendicular to the front support plate, and a coupling plate which is a flat plate connected to the other side of the side support plate and parallel to the front support plate, and the coupling plate may include at least one second coupling hole.

The heat dissipation unit may further include a fan including an intake port and a discharge port, and a fan duct connected to the discharge port to receive discharge air, the intake port may be in contact with the heat sink of the second heat dissipation frame, and the fan duct may transmit air from the discharge port to the heat sink of the first heat dissipation frame.

The fixing plate may include a communication hole positioned to correspond to the fan.

DETAILED DESCRIPTION OF EMBODIMENTS

Hereinafter, the spirit of the present disclosure is described in more detail with reference to the accompanying drawings. Terms and words used in the specification and claims are not to be construed as general or dictionary meanings, and are to be construed as meanings and concepts meeting the spirit of the present disclosure based on a principle that the inventors may appropriately define the concepts of terms in order to describe their inventions in best mode.

Hereinafter, the description describes a basic configuration of a lamp heat dissipation system 1000 of the present disclosure with reference to FIG. 1.

Figure 1:
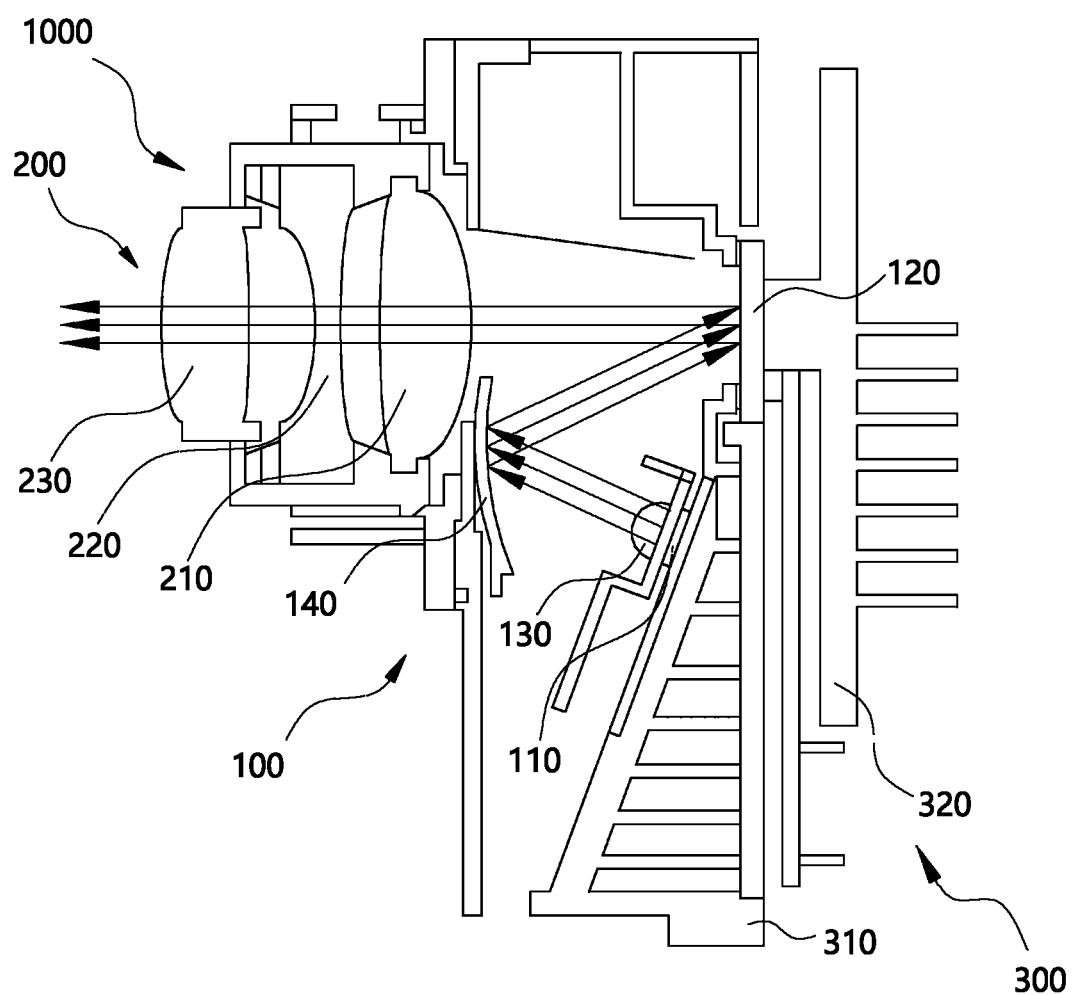
FIG. 1 is a plan view showing a configuration of a lamp heat dissipation system of the present disclosure.

As shown in FIG. 1, the lamp heat dissipation system 1000 of the present disclosure may include an illumination optical system 100, and the illumination optical system 100 may include a light source 110 and a digital micro-mirror device (DMD) module 120 including a plurality of micro mirrors. In more detail, the light source 110 may be a light emitting diode (LED) module, and the DMD module 120 may be a semiconductor micro electro-mechanical system (MEMS) element including about 1 million micro mirrors, and may serve to receive light from the light source 110 and reflect the received light to the outside. The DMD module 120 may be fixed to a DMD plate. The DMD plate may be a printed circuit board (PCB), and a control circuit may be connected to the DMD module 120.

In addition, the lamp heat dissipation system 1000 of the present disclosure may include a projection optical system 200 receiving light transmitted from the illumination optical system 100 and projecting light to the outside. The projection optical system 200 may include a plurality of plastic lenses and glass lenses, and may receive light from the DMD module 120 of the illumination optical system 100 to form an imaging image for implementing a high-resolution image. In addition, the lamp heat dissipation system 1000 of the present disclosure may include a heat dissipation unit 300. The heat dissipation unit 300 may dissipate heat from the illumination optical system 100 to the outside. In more detail, the heat dissipation unit 300 may be a dual heat dissipation system simultaneously dissipating heat from each of the light source 110 and the DMD module 120 that are included in the illumination optical system 100. In this way, it is possible to reduce an overall size of the system by providing one heat dissipation unit 300 as a component dissipating heat occurring from the light source 110 and the DMD module 120, which are separate components.

Hereinafter, the description describes the illumination optical system 100 of the present disclosure in more detail with reference to FIG. 2.

Figure 2:
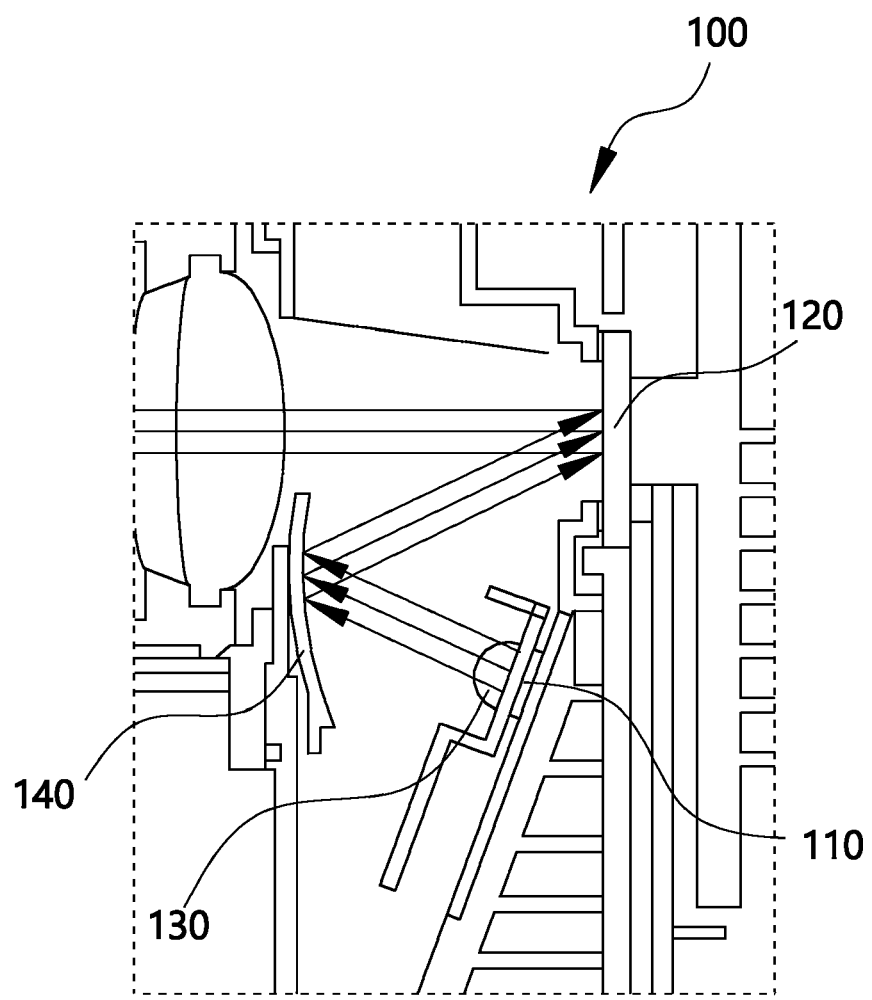
FIG. 2 is a partial plan view showing an illumination optical system of the present disclosure.

As shown in FIG. 2, the illumination optical system 100 may further include a collimator lens 130 and a reflecting surface 140. The collimator lens 130 may adjust light emitted from the light source 110 to be emitted in parallel without being dissipated. The collimator lens 130 may be coupled to the light source 110 by including a holder coupled to the light source 110, and coupled to a first heat dissipation frame 310 described below. The reflecting surface 140 may receive light from the collimator lens 130, and reflect light to the DMD module 120. Then, the DMD module 120 may be disposed behind the light source 110, receive light from the reflecting surface 140, and transmit light to the projection optical system 200.

Figure 3:
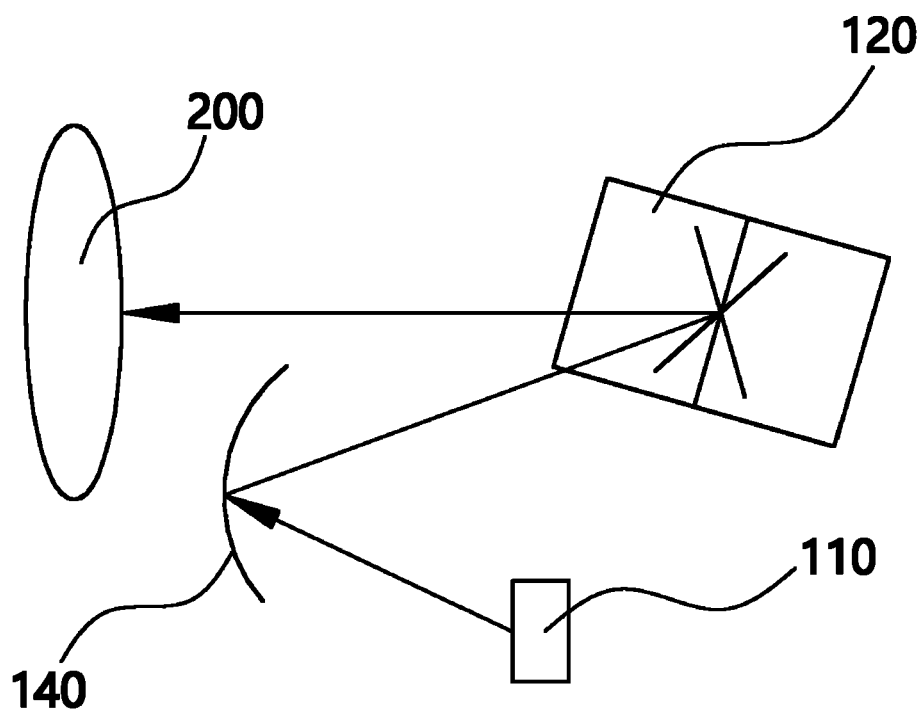
FIG. 3 is a schematic diagram showing the illumination optical system of the present disclosure.

Here, as shown in FIG. 3, the illumination optical system 100 may include less than two light sources 110, that is, only one light source 110. If two or more light sources 110 are provided, when light from each light source 110 may be reflected by the reflecting surface 140 to be transmitted to the DMD module 120, the two lights may fail to have the same focus to thus cause light energy loss. The lamp heat dissipation system 1000 of the present disclosure may thus minimize this phenomenon by including only one light source 110. In addition, as the number of light sources 110 may be reduced to one, it is possible to reduce the number of components such as the light source 110, the collimator lens 130, and the holder to be applied thereto, thereby reducing the overall size of the system. It is also possible to increase Etendue matching of the illumination optical system 100 and the projection optical system 200, and increase optical system efficiency itself by about 10%. In addition, the system of the present disclosure may use only one light source 110 to make a light region narrower, and apply the light source 110 having the narrower region to increase utilization of a solid angle, thereby increasing light efficiency.

Hereinafter, the description describes the projection optical system 200 of the present disclosure in more detail with reference to FIGS. 4 and 5.

Figure 4:
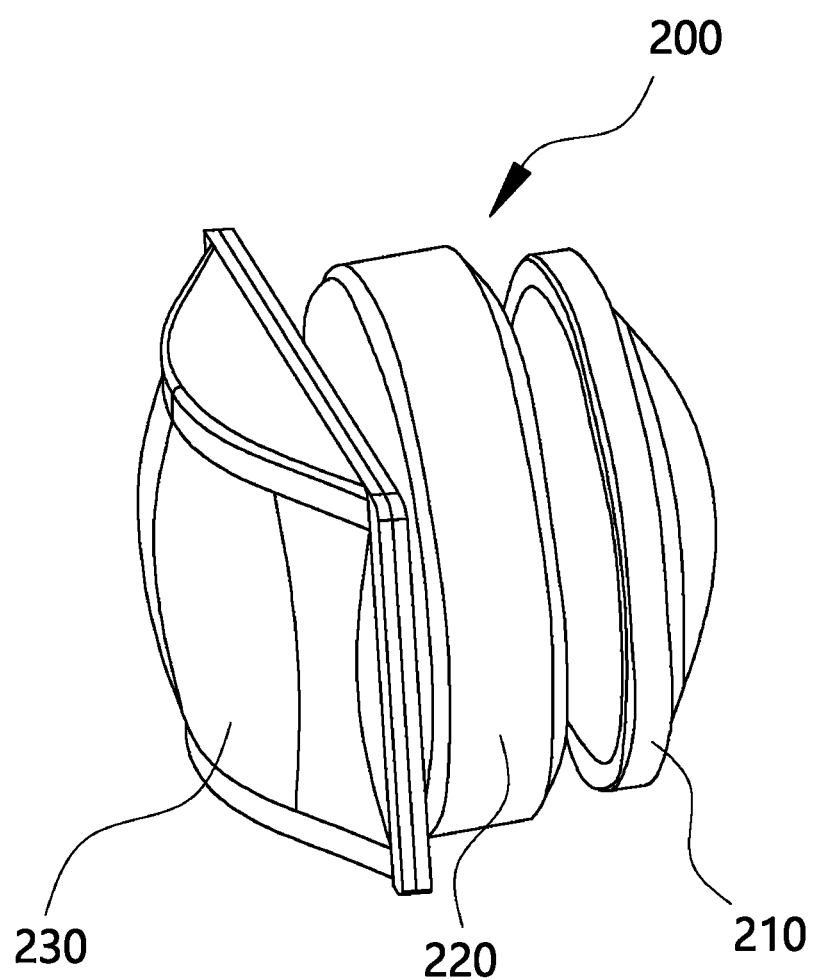
FIG. 4 is an exploded perspective view showing a projection optical system of the present disclosure.
Figure 5:
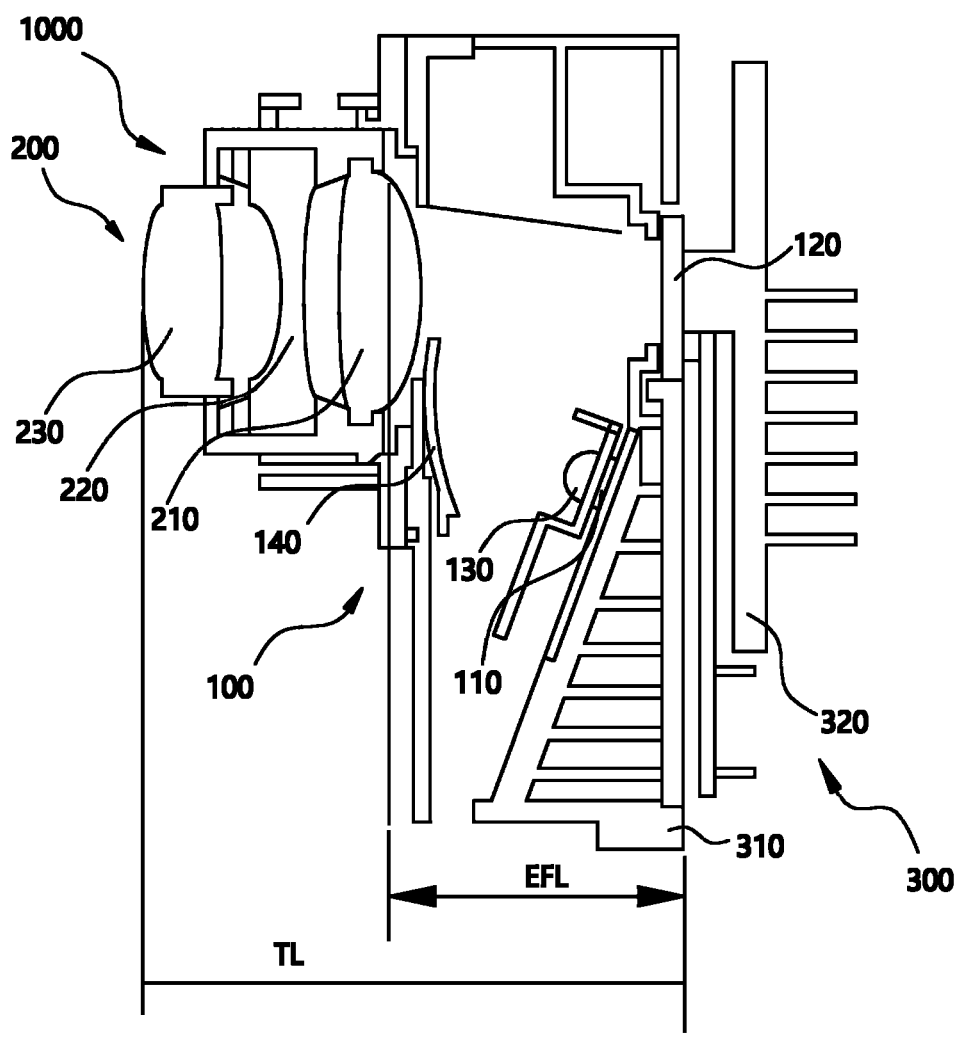
FIG. 5 is a plan view showing a coupling relationship between the projection optical system and illumination optical system of the present disclosure.

As shown in FIG. 4, the projection optical system 200 may include a first lens 210 which is a convex lens directly receiving light from the illumination optical system 100, a second lens 220 which is a concave lens receiving light from the first lens 210 and transmitting light, and a third lens 230 which is a convex lens receiving light from the second lens 220 and projecting light to the outside. Here, the first lens 210 may be a glass aspherical lens, the second lens 220 may be a glass spherical lens, and the third lens 230 may be a plastic aspherical lens. The first lens 210 may receive light by being disposed to be parallel to the DMD module 120.

In addition, the first lens 210 of the projection optical system 200 may be as close as possible to the DMD module 120 of the illumination optical system 100. In more detail, a rear focal length, which is a distance between the first lens 210 and the DMD module 120, may be less than 40 mm. In addition, as shown in FIG. 5, an effective focal length EFL between the DMD module 120 and the first lens 210 may be greater than zero mm and less than 50 mm, and the effective focal length between the DMD module 120 and the first lens 210 may be less than 1.4 times an exit aperture of the third lens 230. Here, a distance TL from the third lens 230 to the DMD module 120 may be less than 80 mm. By adopting such a specification, the present disclosure may provide a system having an optimized effective focal length, an optimized F number (i.e., effective focal length/exit aperture), and enhanced image clarity. It is also possible to reduce a size of the lamp heat dissipation system 1000 of the present disclosure, and increase the light efficiency.

Hereinafter, the description describes the heat dissipation unit 300 of the present disclosure in more detail with reference to FIGS. 6 to 13.

Figure 6:
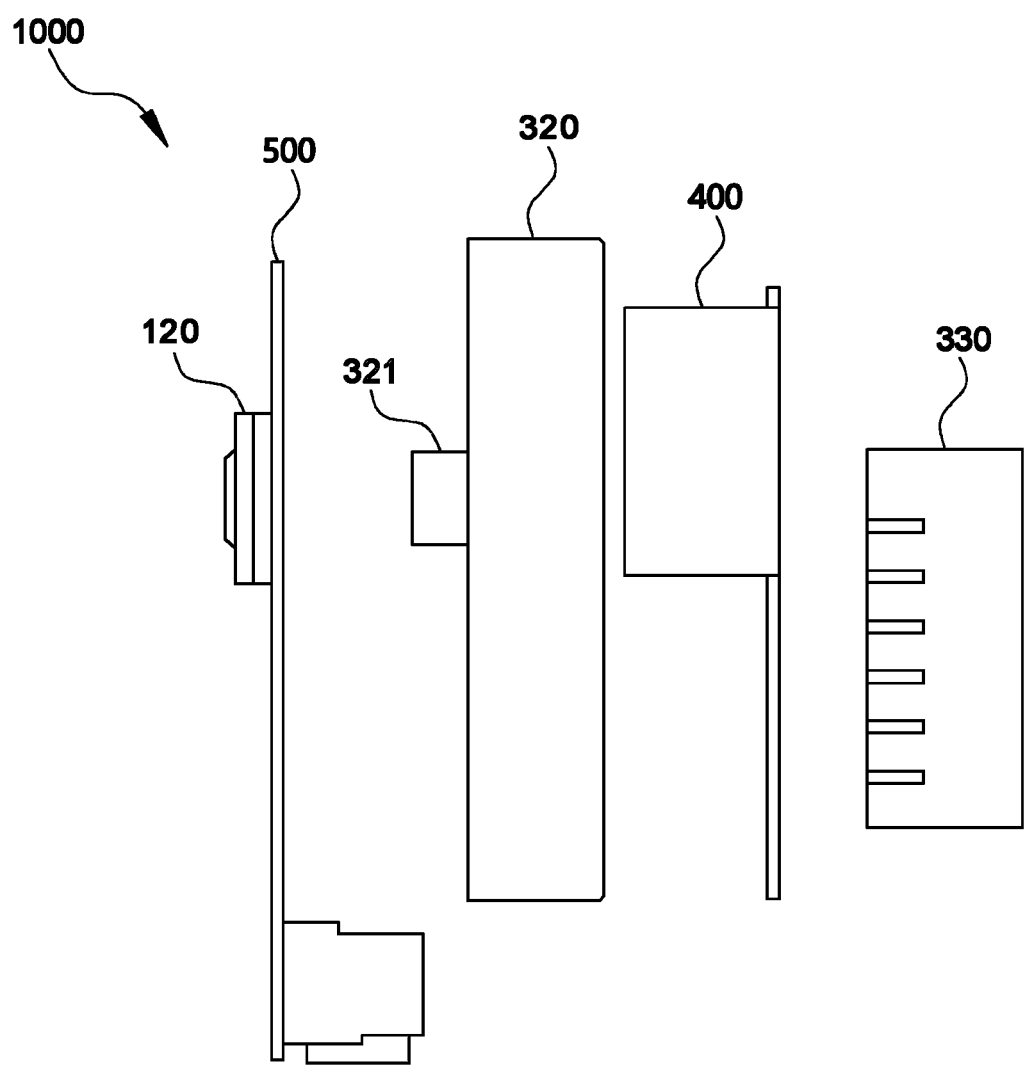
FIG. 6 is a schematic view showing a configuration of a heat dissipation unit of the present disclosure.

As shown in FIG. 6, the heat dissipation unit 300 may include the first heat dissipation frame 310 sandwiched between the light source 110 and the DMD module 120, and having one end in contact with the light source 110, a heat sink being formed on the one end, and a second heat dissipation frame 320 having one surface with which the DMD module 120 is in contact from the rear and the other surface on which a heat sink is formed. The first heat dissipation frame 310 may receive heat from the light source 110 and dissipate heat to the outside through the heat sink, and the second heat dissipation frame 320 may receive heat from the DMD module 120 and dissipate heat to the outside through the heat sink. In addition, the heat dissipation unit 300 of the present disclosure may include a fan 330 including an intake port and a discharge port.

In addition, the lamp heat dissipation system 1000 of the present disclosure may include a fixing plate 400 which includes a flat front support plate 410 in contact with the other surface of the second heat dissipation frame 320 and simultaneously supporting a DMD plate 500 and a heat dissipation plate. The front support plate 410 may have one surface in contact with the other surface of the second heat dissipation frame 320, and the other surface on which the fan 330 can be positioned. The fan 330 can circulate air near the second heat dissipation frame 320 to thus distribute heat dissipated from the second heat dissipation frame 320. The fixing plate 400 supporting the DMD plate 500 may be configured as a single part while having a flat shape to thus more stably support the DMD plate 500 and the DMD module 120 without using a conventional compression spring.

Figure 7:
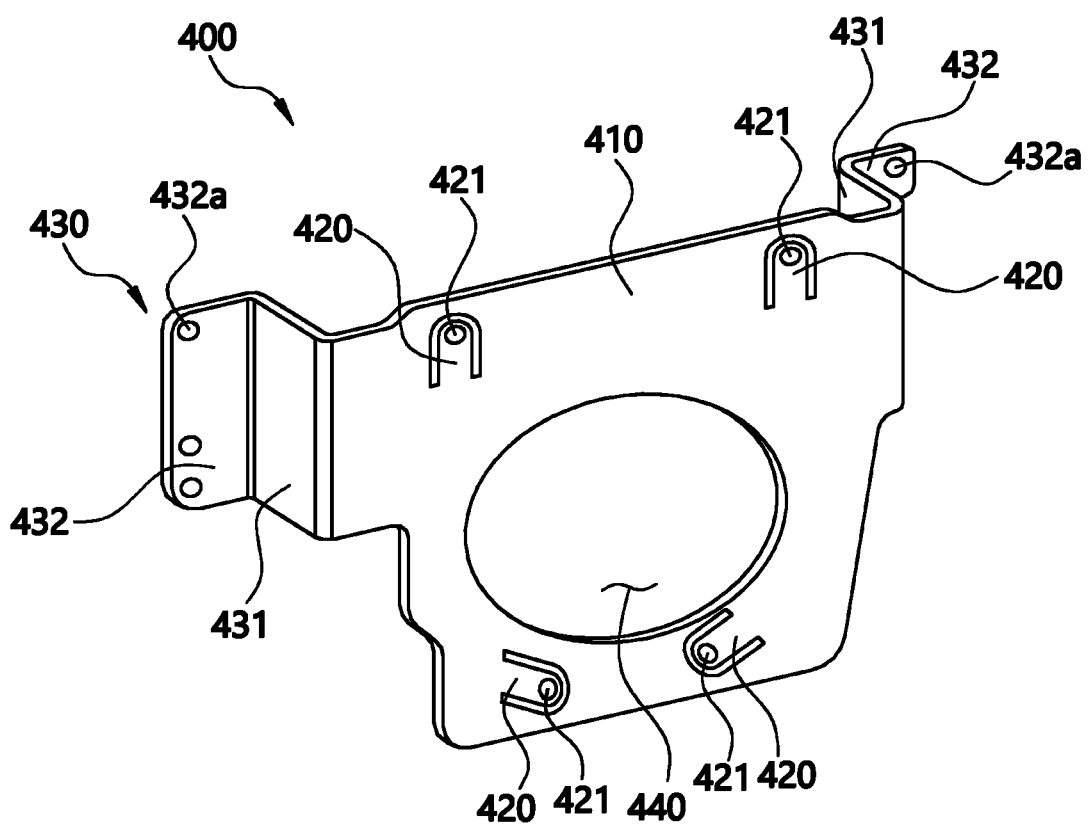
FIG. 7 is a perspective view showing a fixing plate of the present disclosure.

As shown in FIG. 7, the fixing plate 400 may include at least one first mount part 420 mounted on the second heat dissipation frame 320 and supporting a position of the second heat dissipation frame 320. The first mount part 420 may be formed on the front support plate 410, have one end formed integrally with the front support plate 410, and have the other end where a first coupling hole 421 is positioned and coupled to the second heat dissipation frame 320. A coupling member such as a pin or a screw can be inserted and fixed to the first coupling hole 421. In more detail, the first mount part 420 can be formed by cutting the front support plate 410 into a U shape and drilling the first coupling hole 421 in its one end.

The first coupling hole 421 of the first mount part 420 and the corresponding screw or pinhole of the second heat dissipation frame 320 may be positioned to be offset from each other by a predetermined distance in a predetermined direction. Accordingly, the first mount part 420 can be coupled to the second heat dissipation frame 320 in its existing position while being bent in the predetermined direction. Therefore, the first mount part 420 can generate a restoring force by its elasticity, and apply a certain pressure to the second heat dissipation frame 320 through the restoring force. Here, the force applied by the first mount part 420 can be 40N to 510N, and this range can be flexibly changed depending on the material and shape of the DMD plate 500 and those of the second heat dissipation frame 320. The lamp heat dissipation system 1000 of the present disclosure, which uses this configuration, can satisfy heat dissipation performance of the DMD module 120 and absorb the impact and the vibration, applied to the DMD module 120 and the DMD plate 500.

In addition, the fixing plate 400 may include a communication hole 440 positioned in the front support plate 410 positioned to correspond to the fan 330. Accordingly, air can flow between the fan 330 and the second heat dissipation frame 320, and heat dissipated from the second heat dissipation frame 320 can be easily dispersed to the outside by the fan 330.

Further, the fixing plate 400 may include two second mount parts 430 extending to both its sides, and each second mount part 430 may be mounted on the first heat dissipation frame 310 described below to support a position of the first heat dissipation frame 310. In more detail, the second mount part 430 may include a side support plate 431 which is a flat plate having one side connected to the front support plate 410 and perpendicular to the front support plate 410, and a coupling plate 432 which is a flat plate connected to the other side of the side support plate 431 and parallel to the front support plate 410. The side support plate 431, the coupling plate 432, and the front support plate 410 can all be integrated with one another, and can be formed by bending one plate. Here, the coupling plate 432 may include at least one second coupling hole 432a. A coupling member such as a pin or a screw can be inserted and fixed to the second coupling hole 432a.

Accordingly, a load applied by the fixing plate 400 can be distributed not only to the second heat dissipation frame 320 but also to a side of the fixing plate 400. In addition, when the coupling plate 432 and the first heat dissipation frame 310 are coupled with each other, a predetermined load can be applied to the DMD plate 500 and the second heat dissipation frame 320 in both directions by the elastic force of the side support plate 431, thereby stably supporting their positions.

Figure 8:
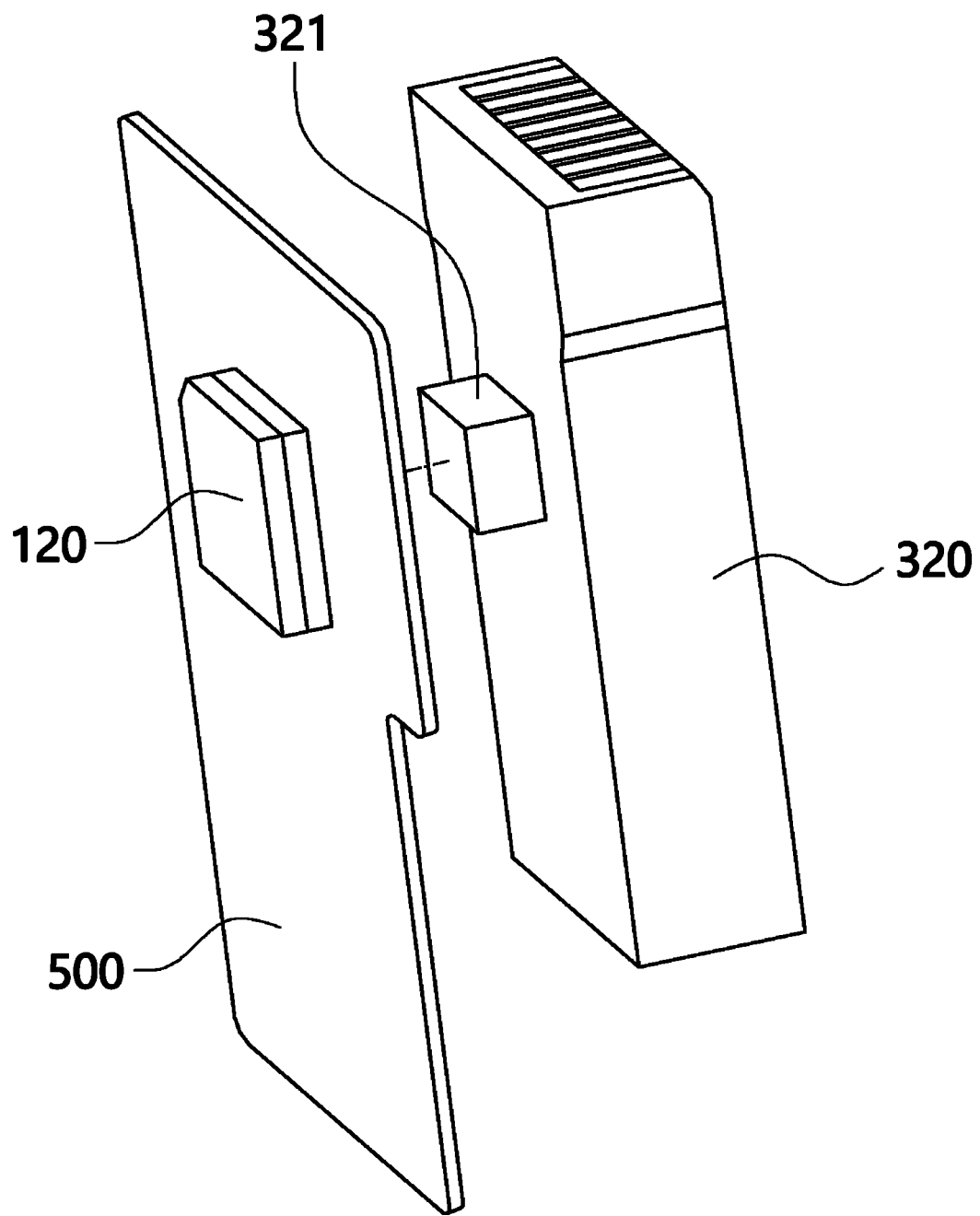
FIG. 8 is an exploded perspective view showing a coupling relationship between the second heat dissipation frame and DMD plate of the present disclosure.
Figure 9:
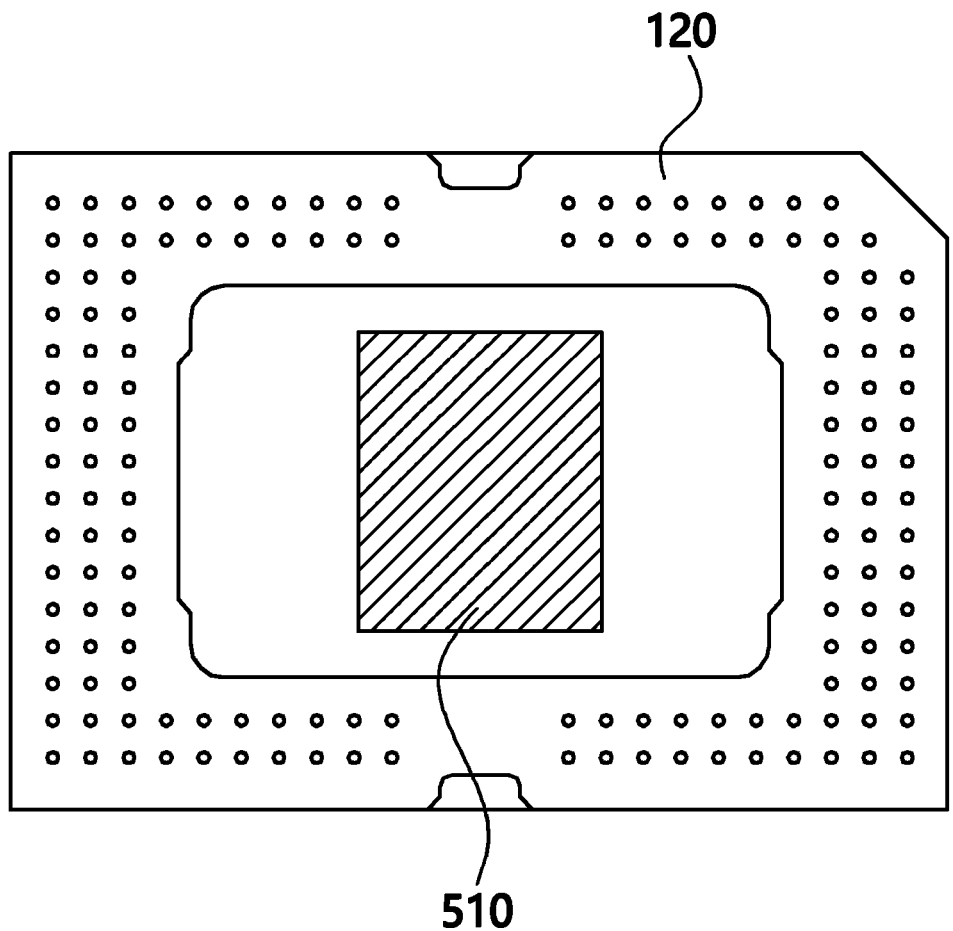
FIG. 9 is a plan view of the DMD plate of the present disclosure.

Here, as shown in FIG. 8, the second heat dissipation frame 320 may include a contact part 321 having a predetermined height and protruding from one surface. The contact part 321 may be made of a thermally conductive material, or made of an elastic member. As shown in FIG. 9, the contact part 321 may be in contact with a predetermined region concave inward in a rear surface of the DMD module 120. Accordingly, the lamp heat dissipation system 1000 of the present disclosure may fix the DMD module 120 by providing a pressure thereto, and heat occurring in the DMD module 120 may be easily transmitted through the contact part 321. Simultaneously, the contact part 321 may prevent the DMD module 120 from being in full contact with the second heat dissipation frame 320 not to directly transmit vibration and impact to the DMD module 120, thereby providing a more stable system.

Figure 10:
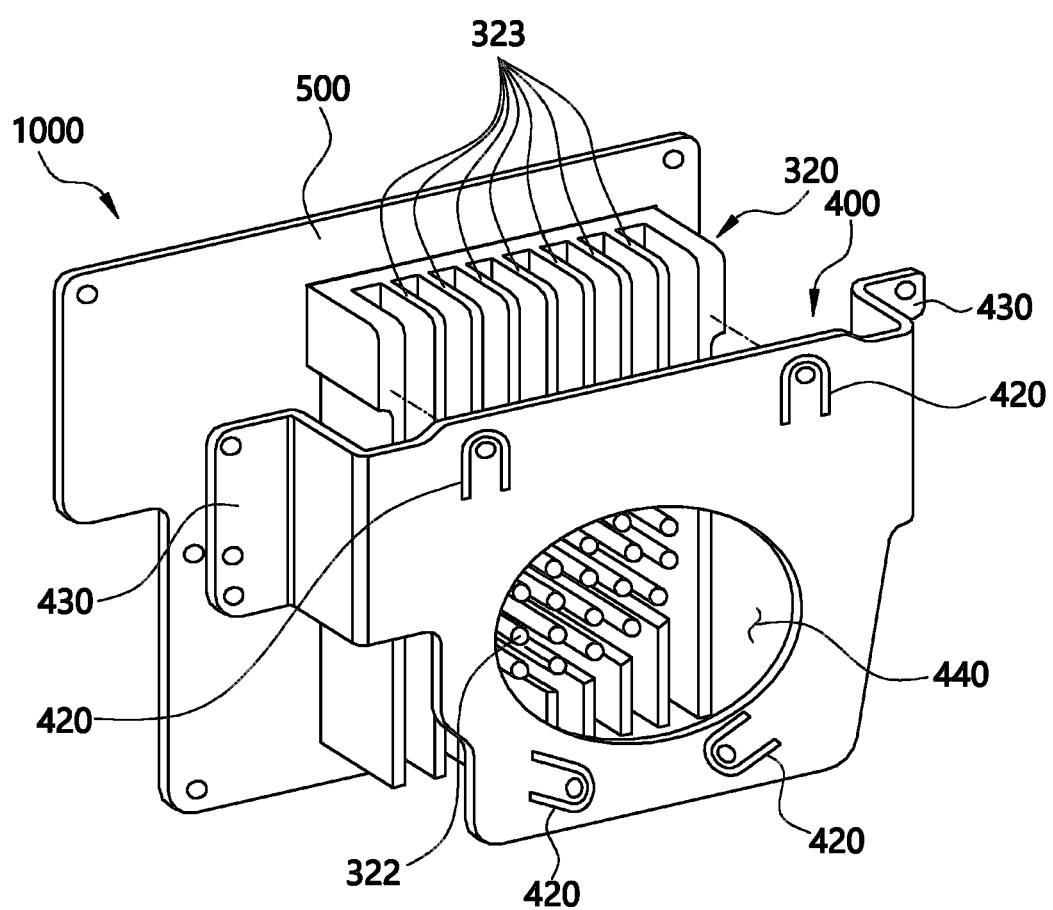
FIG. 10 is an exploded perspective view showing the coupling relationship between the fixing plate and second heat dissipation frame of the present disclosure.

In addition, as shown in FIG. 10, the second heat dissipation frame 320 may include the heat sink on the other surface, and a plurality of pins 322 each having a predetermined height and positioned on the other surface to correspond to the fan 330. Here, the respective pins 322 may be disposed to be spaced apart from each other by the certain distance. In addition, the heat sink may include thin plates 323 each having a predetermined thickness and positioned in a region excluding its position corresponding to the fan 330, and the respective thin plates 323 may be disposed to be spaced apart from each other by a certain distance in one direction.

The fan 330 can dissipate heat from the second heat dissipation frame 320 to the outside by suctioning air near the second heat dissipation frame 320, and then discharging the suctioned air to the outside. The second heat dissipation frame 320 may include a pin 322 at its position corresponding to the fan 330 (pin type), and may include the thin plate 323 at its position not corresponding to the fan 330 (fin type). Accordingly, in the region where the thin plate 323 is positioned, air may flow in a consistent direction, that is, in a direction in which the thin plate 323 is positioned; and in the region where the pin 322 is positioned, air in the vertical direction or the left-right direction may be easily concentrated and introduced into the fan 330. A type using the thin plate 323 may have higher heat dissipation efficiency than a type using the pin 322. Therefore, the thin plate 323 may be used in a region where there is a low need to concentrate air on the fan 330.

Figure 11:
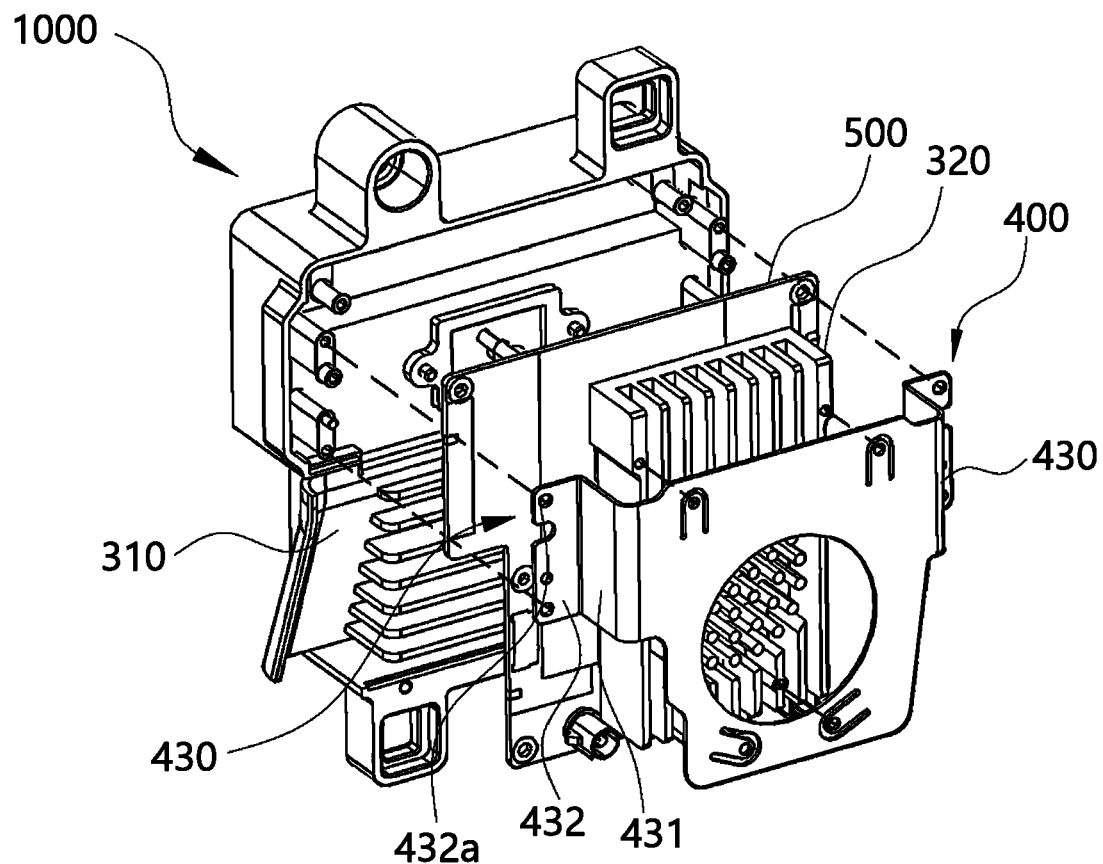
FIG. 11 is an exploded perspective view showing the coupling relationship between the fixing plate and the first heat dissipation frame of the present disclosure.

As shown in FIG. 11, each second mount part 430 may be mounted on the first heat dissipation frame 310 described below, and support the position of the first heat dissipation frame 310. In more detail, the second mount part 430 may include the side support plate 431 which is the flat plate having one side connected to the front support plate 410 and perpendicular to the front support plate 410, and the coupling plate 432 which is a flat plate connected to the other side of the side support plate 431 and parallel to the front support plate 410. The side support plate 431, the coupling plate 432, and the front support plate 410 can all be integrated with one another, and can be formed by bending one plate. Here, the coupling plate 432 may include at least one second coupling hole 432a. The coupling member such as a pin or a screw can be inserted and fixed to the second coupling hole 432a.

Figure 12:
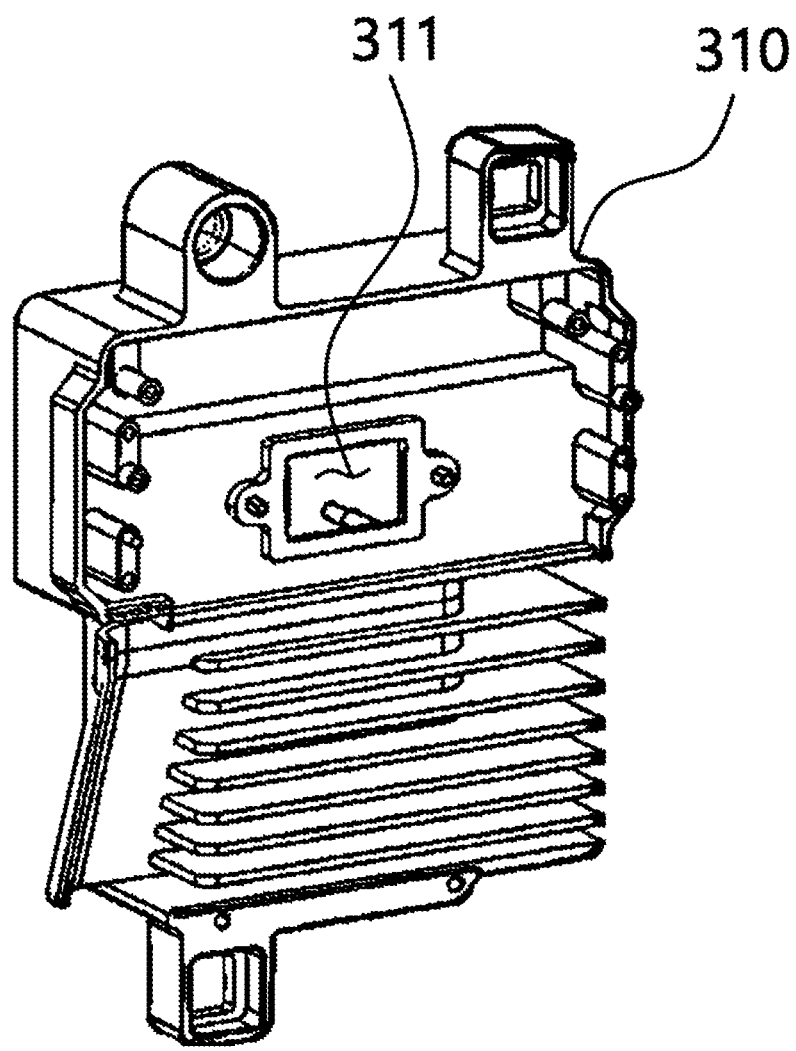
FIG. 12 is a perspective view showing a first example of a first heat dissipation frame of the present disclosure.

In addition, as shown in FIG. 12, the heat sink of the first heat dissipation frame 310 may include the plurality of flat plates, and the respective flat plates may be disposed to be spaced apart from each other by a certain distance in one direction (i.e., fin type). The flat plate may be disposed as flat plates each perpendicular to the height direction of the lamp heat dissipation system 1000. Accordingly, intake air through the fan duct 340 may pass between the flat plates and flow quickly without obstruction, and cross the first heat dissipation frame 310 to dissipate heat near the first heat dissipation frame 310 to the outside.

Figure 13:
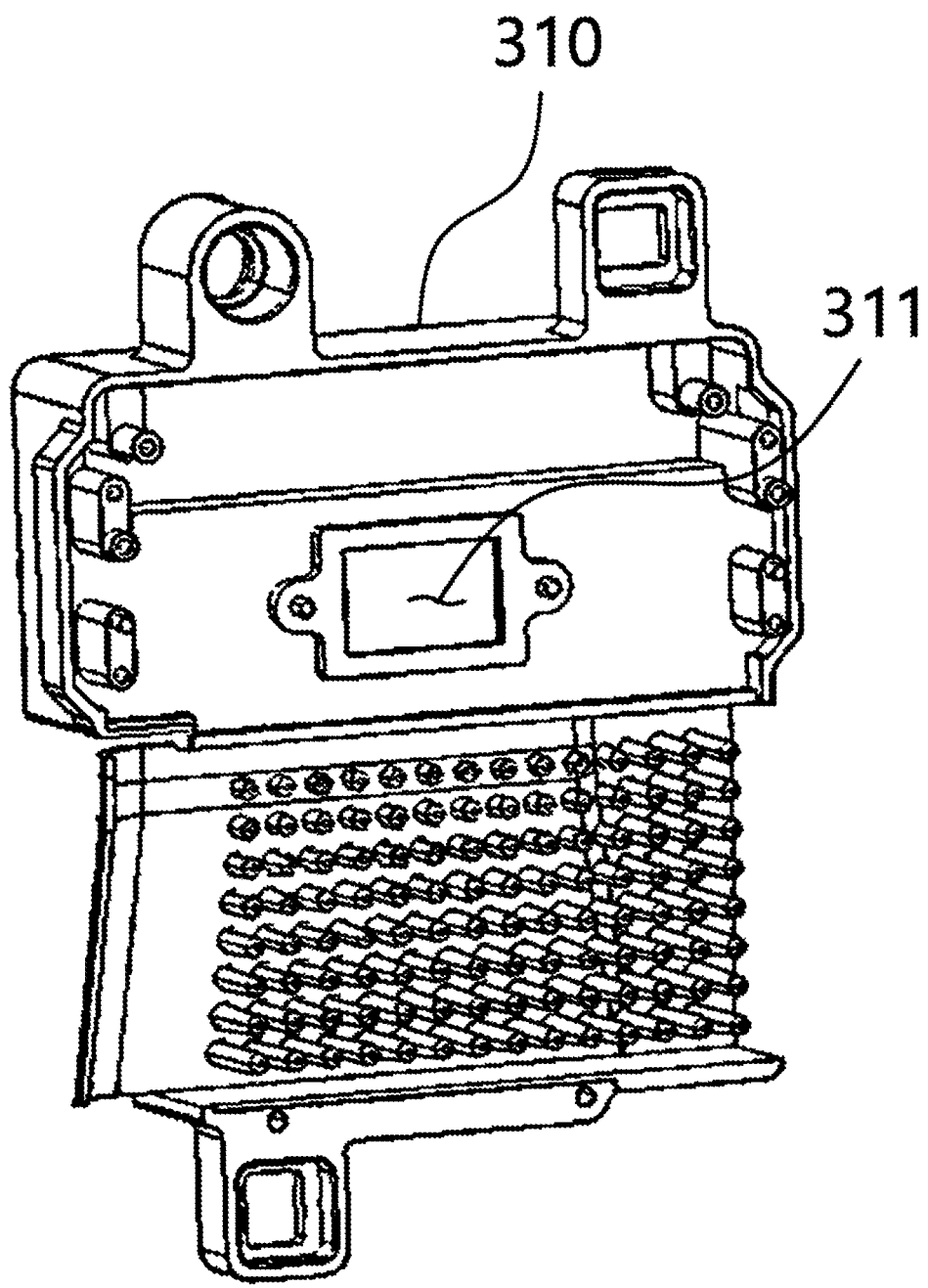
FIG. 13 is a perspective view showing a second example of the first heat dissipation frame of the present disclosure.

Furthermore, as shown in FIG. 13, the heat sink of the first heat dissipation frame 310 may include a plurality of pins each having a predetermined height, and the respective pins may form a checkerboard pattern by being disposed to be spaced apart from each other by a certain distance (i.e., pin type). Accordingly, intake air through the fan duct 340 may pass between the respective pins to cross the first heat dissipation frame 310. As described above, the heat sink may include the plurality of pins, no matter which direction the fan duct 340 supplies air, air may easily cross the first heat dissipation frame 310 and dissipate heat near the first heat dissipation frame 310 to the outside.

In addition, as shown in FIGS. 12 and 13, the first heat dissipation frame 310 may include a light emission hole 311 positioned to correspond to a DMD module 120. That is, the DMD module 120 can receive light from a reflecting surface where light is reflected from the light source coupled to one surface of the first heat dissipation frame 310, and light reflected by the DMD module 120 may be emitted to the outside through the light emission hole 311 of the first heat dissipation frame 310. In more detail, light can be emitted to a projection optical system including a convex lens and a concave lens to thus be emitted to the outside of the lamp heat dissipation system 1000.

Figure 14:
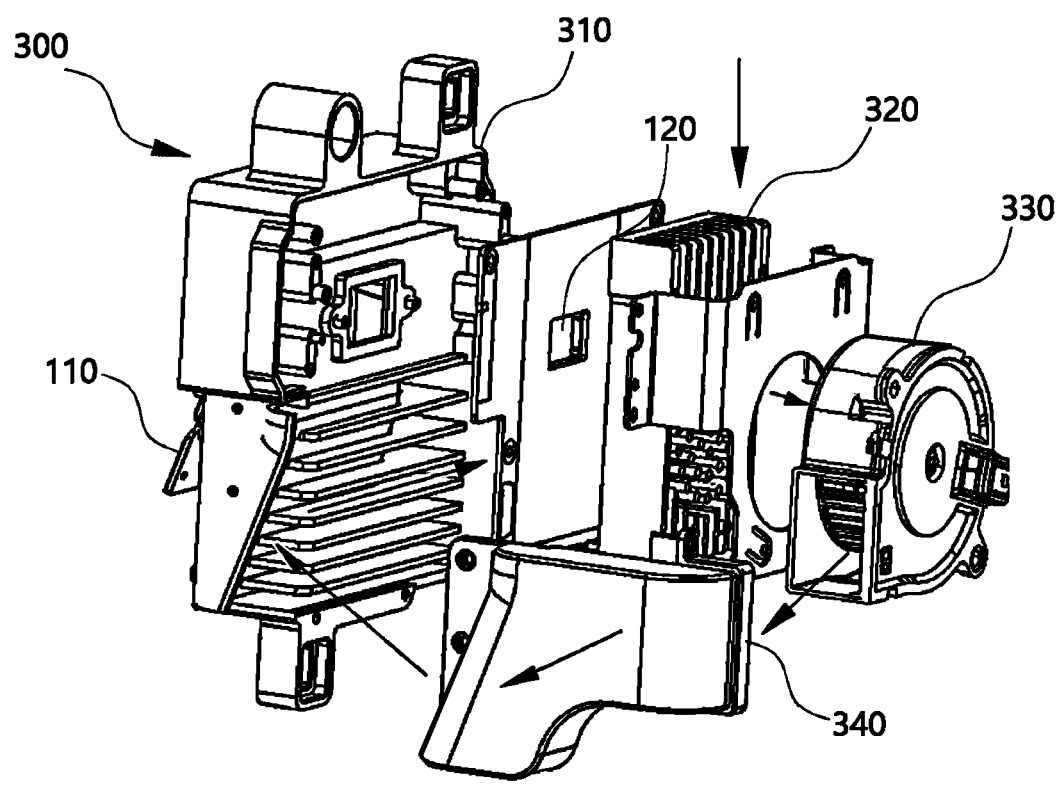
FIG. 14 is a schematic view showing air flow in the heat dissipation unit of the present disclosure.

In addition, as shown by arrows in FIG. 14, the heat dissipation unit 300 may simultaneously dissipate heat from the first heat dissipation frame 310 and the second heat dissipation frame 320 by controlling an air flow. The fan 330 may be disposed on the other surface of the second heat dissipation frame 320 to intake air heated by the heat dissipation of the second heat dissipation frame 320 and discharge the same through the discharge port. Accordingly, the heat dissipation unit 300 may further include a fan duct 340 connected to the discharge port to receive air discharged from the fan 330, and discharge intake air to a desired position through the fan duct 340. In more detail, intake air may be transmitted to the heat sink of the first heat dissipation frame 310.

That is, heat occurring from the light source 110 and the DMD module 120 may respectively be dissipated through the first heat dissipation frame 310 and the second heat dissipation frame 320, and the dissipated heat may be dissipated to the outside through one fan 330. The relatively bulky components such as the fan 330 and the fan duct 340 may be simultaneously interchanged with both the first heat dissipation frame 310 and second heat dissipation frame 320, thus making the lamp heat dissipation system 1000 of the present disclosure smaller and increasing heat dissipation efficiency.

As set forth above, the lamp heat dissipation system of the present disclosure configured as above may reduce the module size and improve the optical performance by including one LED and reducing the distance between the light source and the DMD module, and the distance between the DMD module and the projection optical system.

In addition, the lamp heat dissipation system of the present disclosure may reduce the module size and improve the heat dissipation performance by configuring the LED and DMD module to dissipate heat as one heat dissipation structure.

In addition, the lamp heat dissipation system of the present disclosure may provide the more stable system by including the flat fixing plate and mounting the DMD element thereon by means of the mounting structure using the spring-type elastic feature provided on the fixing plate.

In addition, the lamp heat dissipation system of the present disclosure may include the flat fixing plate directly coupled to the heat sink, the DMD module fixed to the heat sink, and the protruding contact part preventing the DMD module from being in full contact with the heat sink to prevent vibration and impact from being directly transmitted to the DMD module, thereby providing the more stable system.

The spirit of the present disclosure should not be limited to the embodiments described above. The present disclosure may be applied to various fields, and may be variously modified by those skilled in the art without departing from the scope of the present disclosure claimed in the claims. Therefore, it is obvious to those skilled in the art that these alterations and modifications fall within the scope of the present disclosure.

What is claimed is:

1. A lamp heat dissipation system comprising:
    an illumination optical system comprising a light source and a digital micro-mirror device (DMD) module comprising a plurality of micro mirrors;
    a projection optical system configured to receive light transmitted from the illumination optical system and project light outside the system; and
    a heat dissipation unit configured to dissipate heat from the illumination optical system outside the system, wherein the heat dissipation unit comprises:
        a first heat dissipation frame disposed between the light source and the DMD module, and having one end in contact with the light source, a heat sink being formed on the one end, and
        a second heat dissipation frame having one surface with which the DMD module is in contact from a rear and another surface on which a heat sink is formed; and
    wherein the heat dissipation unit is configured to simultaneously dissipate heat from each of the light source and the DMD module.

2. The system of claim 1, wherein the illumination optical system has less than two light sources.

3. The system of claim 2, wherein the illumination optical system further comprises:
    a collimator lens comprising a holder coupled to the light source, and configured to emit light of the light source in parallel; and
    a reflecting surface configured to receive light from the collimator lens and reflecting light.

4. The system of claim 3, wherein the DMD module is disposed behind the light source, is configured to receive light from the reflecting surface, and is configured to transmit light to the projection optical system.

5. The system of claim 4, wherein the projection optical system comprises:
    a first lens which is a convex lens configured to directly receive light from the illumination optical system,
    a second lens which is a concave lens configured to receive light from the first lens and transmit light, and
    a third lens which is a convex lens configured to receive light from the second lens and project light outside the system.

6. The system of claim 5, wherein the DMD module is disposed to be parallel to the first lens.

7. The system of claim 5, wherein an effective focal length between the DMD module and the first lens is greater than zero mm and less than 50 mm.

8. The system of claim 7, wherein the effective focal length between the DMD module and the first lens is less than 1.4 times an exit aperture of the third lens.

9. The system of claim 1, wherein the first heat dissipation frame comprises a light emission hole positioned to correspond to the DMD module.

10. The system of claim 1, wherein the second heat dissipation frame comprises a contact part having a predetermined height and protruding from one surface, and
    the contact part is positioned to correspond to the DMD module.

11. The system of claim 1, wherein each of the first heat dissipation frame and the second heat dissipation frame comprising the heat sink,
    the heat sink comprises at least one of a plurality of pins each having a predetermined height and positioned on the another surface of the second heat dissipation frame to correspond to a fan or thin plates each having a predetermined thickness and positioned in a region excluding its position corresponding to the fan, and
    the respective pins or the respective thin plates are spaced apart from each other by a certain distance.

12. The system of claim 1, further comprising:
a DMD plate comprising one surface coupled to the DMD module and the first heat dissipation frame and whose position is supported by the first heat dissipation frame; and
a fixing plate comprising a flat front support plate in contact with the another surface of the second heat dissipation frame and simultaneously supporting the DMD plate and the second heat dissipation frame.

13. The system of claim 12, wherein the fixing plate comprises at least one first mount part mounted on the second heat dissipation frame and supporting a position of the second heat dissipation frame.

14. The system of claim 13, wherein the first mount part is positioned on the front support plate, has one end formed integrally with the front support plate, and has another end where a first coupling hole is positioned and coupled to the second heat dissipation frame.

15. The system of claim 12, wherein the fixing plate comprises two second mount parts extending to both its sides, and each second mount part is mounted on the first heat dissipation frame to support a position of the first heat dissipation frame.

16. The system of claim 15, wherein the second mount part comprises a side support plate which is a flat plate having one side connected to the front support plate and perpendicular to the front support plate, and a coupling plate which is a flat plate connected to another side of the side support plate and parallel to the front support plate, and
the coupling plate comprises at least one second coupling hole.

17. The system of claim 12, wherein the heat dissipation unit further comprises a fan comprising an intake port and a discharge port, and a fan duct connected to the discharge port configured to receive discharge air,
the intake port is in contact with the heat sink of the second heat dissipation frame, and
the fan duct is configured to transmit air from the discharge port to the heat sink of the first heat dissipation frame.

18. The system of claim 17, wherein the fixing plate comprises a communication hole positioned to correspond to the fan.

* * * * *